(12) United States Patent
Schroeder et al.

(10) Patent No.: US 10,674,668 B2
(45) Date of Patent: Jun. 9, 2020

(54) REEL TINE FOR A HARVESTING REEL OF A HARVESTER AND A METHOD OF ASSEMBLING A TINE TO A HARVESTING REEL

(71) Applicant: CNH America LLC, New Holland, PA (US)

(72) Inventors: Luke Andrew Schroeder, Coal Valley, IL (US); Gary Lyman Bich, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 958 days.

(21) Appl. No.: 14/044,425

(22) Filed: Oct. 2, 2013

(65) Prior Publication Data
US 2015/0089916 A1 Apr. 2, 2015

(51) Int. Cl.
*A01D 57/00* (2006.01)
*A01D 57/02* (2006.01)
*A01D 80/02* (2006.01)

(52) U.S. Cl.
CPC ............. *A01D 57/02* (2013.01); *A01D 80/02* (2013.01); *Y10T 29/49947* (2015.01)

(58) Field of Classification Search
CPC .. A01D 57/12; A01D 80/02; Y10T 403/7005; Y10T 403/7015; F16B 21/02
USPC .................... 56/16.1, 220, 364, 400, 400.21; 172/49.5; 403/348, 353
See application file for complete search history.

(56) References Cited

U.S. PATENT DOCUMENTS

| | | | |
|---|---|---|---|
| 524,215 A * | 8/1894 | Quigley | 56/400.16 |
| 665,226 A | 1/1901 | Johnston | |
| 671,288 A | 4/1901 | Macphail | |
| 728,592 A | 5/1903 | Macphail | |
| 2,603,936 A | 7/1952 | Keene | |
| 3,468,109 A | 9/1969 | Riemer | |
| 3,616,631 A | 11/1970 | Quam | |
| 3,613,346 A | 10/1971 | Hubbard | |
| 3,626,678 A * | 12/1971 | Quam | 56/400 |
| 3,785,134 A | 1/1974 | Francis et al. | |
| 3,859,777 A | 1/1975 | Doering | |
| 3,921,376 A * | 11/1975 | Hofer | 56/400 |
| 3,943,999 A * | 3/1976 | van der Lely et al. | 172/49.5 |
| 4,077,476 A * | 3/1978 | van der Lely | 172/49.5 |
| 4,189,907 A | 2/1980 | Erdman | |
| 4,382,356 A * | 5/1983 | Ballas, Sr. | A01D 34/4168 56/12.7 |
| 4,429,917 A * | 2/1984 | Diffrient | A47C 1/03255 297/300.5 |

(Continued)

FOREIGN PATENT DOCUMENTS

JP 2001327214 11/2001

*Primary Examiner* — Thomas B Will
*Assistant Examiner* — Mai T Nguyen
(74) *Attorney, Agent, or Firm* — Peter Zacharias; Patrick Sheldrake

(57) ABSTRACT

A harvesting reel of an agricultural harvester having a plurality of support members mounted to a frame and a plurality of tines press-fitted onto the support member is disclosed. The plurality of tines includes a cam for securely attaching the tine to the support member via a press-fit application to forego the need for any additional separate fasteners and tools necessary for production of the harvesting reel and maintenance upkeep of the plurality of tines on the harvesting reel.

22 Claims, 5 Drawing Sheets

(56) References Cited

U.S. PATENT DOCUMENTS

| | | | |
|---|---|---|---|
| 4,489,539 A | 12/1984 | Fralish | |
| 4,882,899 A * | 11/1989 | Jasper et al. | 56/220 |
| 4,901,511 A | 2/1990 | Yarmashev et al. | |
| 5,313,771 A * | 5/1994 | France | A01D 46/12 |
| | | | 56/126 |
| 6,910,323 B2 | 6/2005 | Bickel | |
| 7,516,604 B2 * | 4/2009 | Josset | 56/364 |
| 7,650,737 B1 * | 1/2010 | Lovett et al. | 56/220 |
| 8,051,636 B2 | 11/2011 | McClure et al. | |
| 8,833,048 B2 * | 9/2014 | Honey et al. | 56/220 |
| 2005/0079010 A1 * | 4/2005 | Droppleman | F16B 21/04 |
| | | | 403/348 |

* cited by examiner

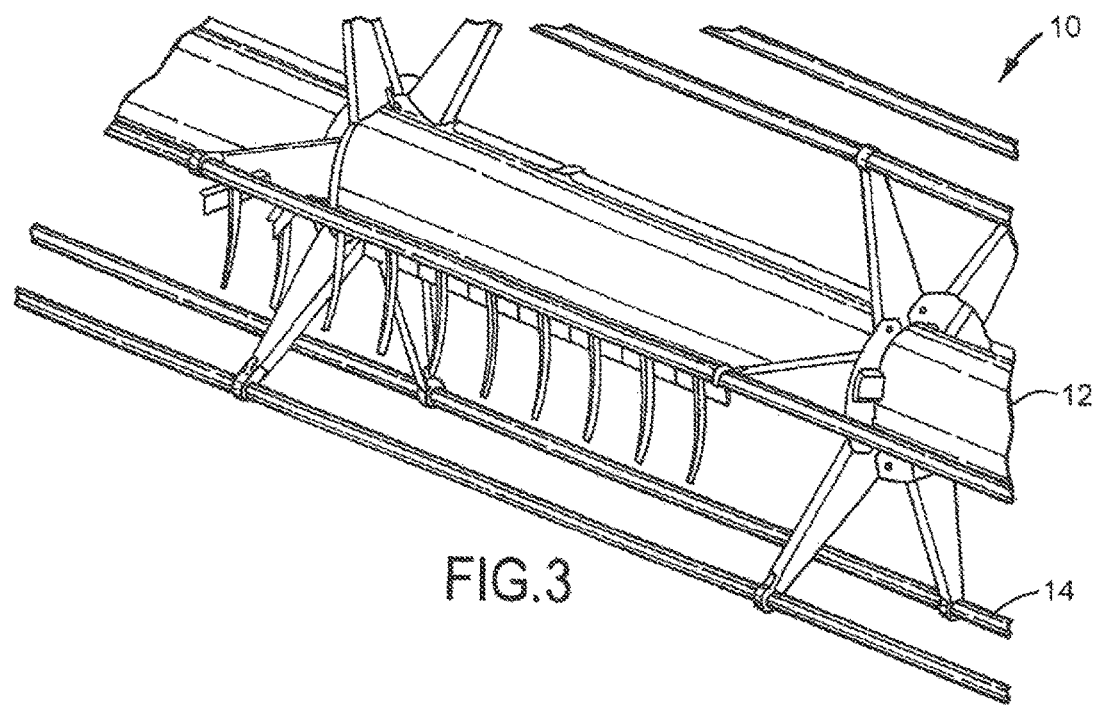
FIG.3
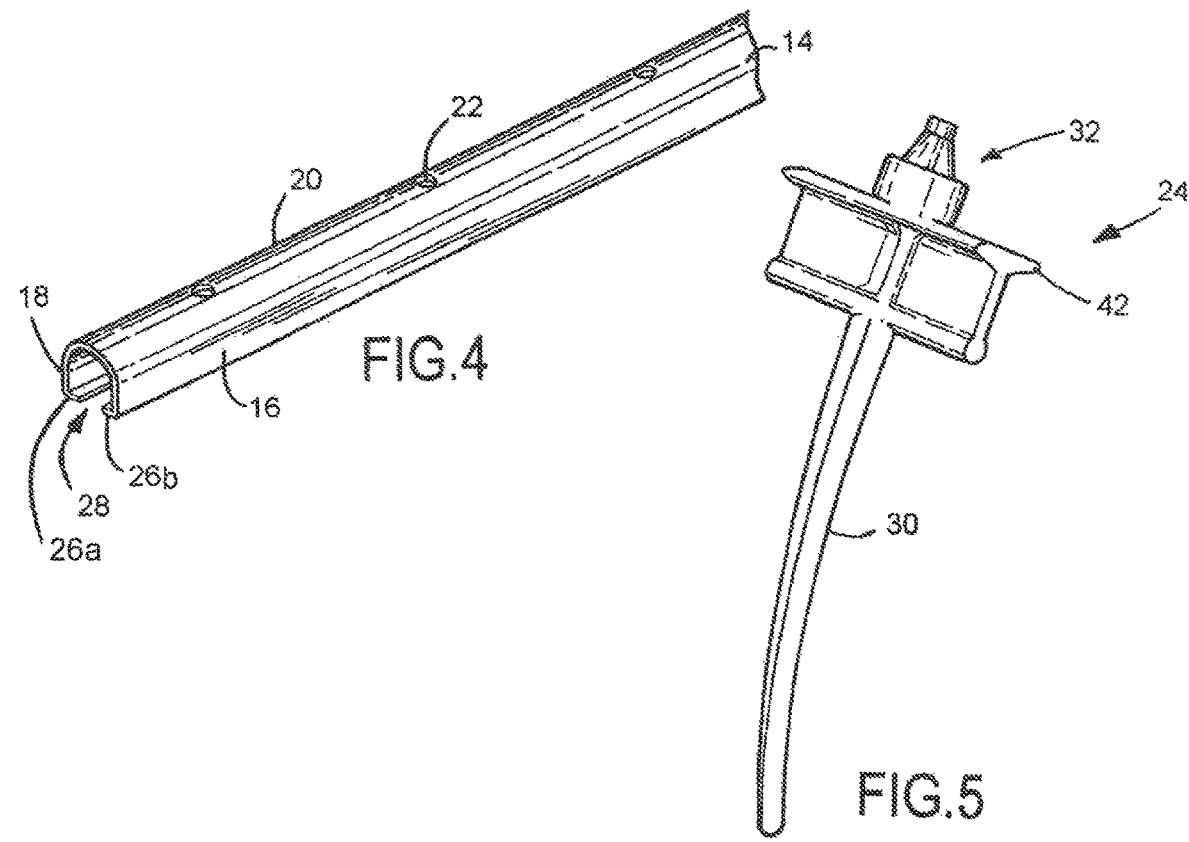
FIG.4
FIG.5

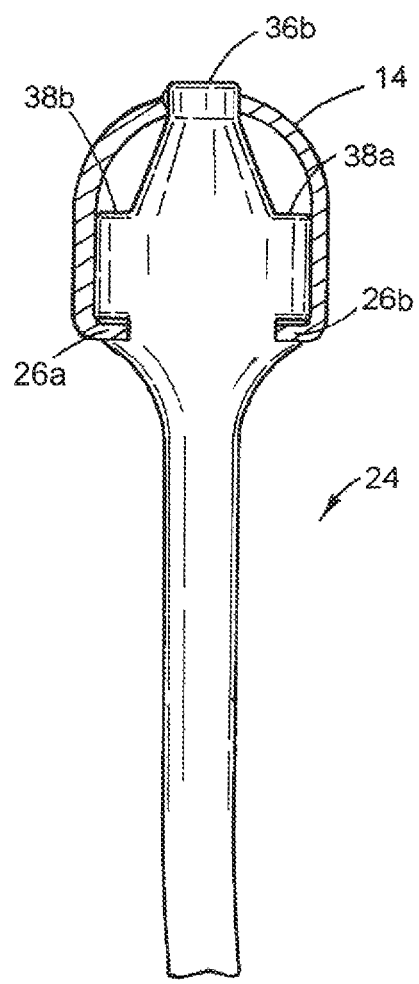
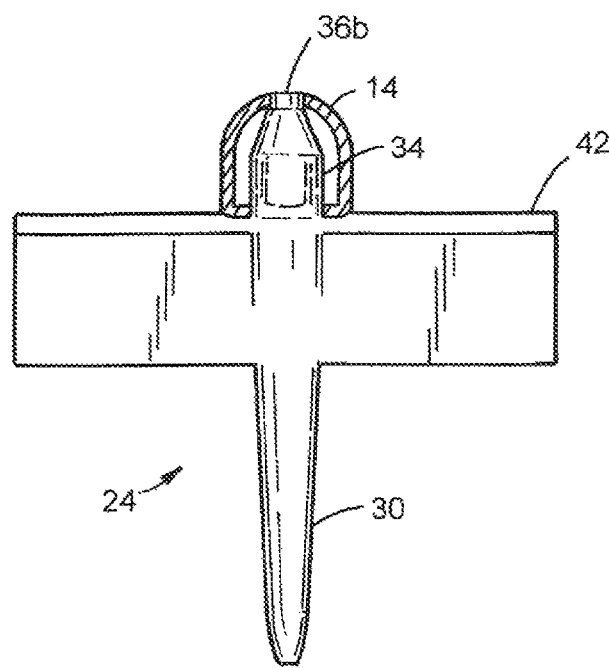
FIG.8
FIG.9
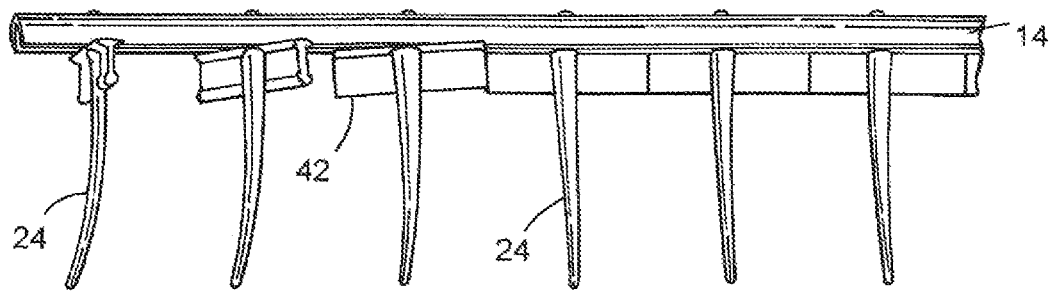
FIG.10

REEL TINE FOR A HARVESTING REEL OF A HARVESTER AND A METHOD OF ASSEMBLING A TINE TO A HARVESTING REEL

BACKGROUND

The subject application relates generally to a reel tine for a harvesting reel of a harvester and a method of assembling a tine to a harvesting reel. In particular, the subject application relates to an improved fastener for connecting a tine to a harvesting reel.

Harvesting reels, such as a pickup reel, a draper reel and a gathering reel, are used on agricultural machines and include a plurality of parallel tine bars arranged in a substantially cylindrical pattern which is rotated about a central axis. Individual tines are connected to the tine bars and extend generally outwardly to engage crop material. The tine bars may be individually rotated dependent upon the reel rotational position of the tines relative to the reel rotational position, such as for folding the tines inwardly at a point in the rotation to release the crop material for feeding into the agricultural machine. Tines are typically connected to the tine bars using a variety of separate bolts, clips, or cast mounts, all of which increase the total part count of the reel and hence, increase production costs and maintenance costs.

BRIEF SUMMARY

In accordance with an aspect of the subject application there is provided a harvesting reel for an agricultural harvester having a plurality of tines connected to support members. Each of the plurality of tines is connected to a support member without the need for separate fasteners or tools for assembly of the tine to the support member. Specifically, each of the plurality of tines is connected to the support member (or each of a plurality of support members) by engendering a fastener for fitting (e.g., press fit or interference fit) assembly to the support member to provide for a simple and easily operable attachment. The foregoing advantageously provides an improved mounting device for attaching a tine to a tine bar in a harvesting reel that is easy to construct and assemble, and which has a lower number of parts thereby decreasing production and maintenance costs.

In accordance with another aspect of the subject application there is provided a tine for a harvesting reel of an agricultural harvester. The tine includes an elongated body and a fastener for fitting (e.g., press fitting) attachment of the tine to a support member of the gathering reel without the need for any separate fixation device or tool for assembly of the tine to the support member. Specifically, the tine includes a fastener having a cam for press fit assembly onto a support member to achieve attachment in a simple and easy to use manner.

In accordance with yet another aspect of the subject application there is provided a method of assembling a tine to a harvesting reel of an agricultural harvester. The method includes the acts of providing a harvesting reel having a support member extending across a width of the harvesting reel, providing a tine having a fastener that includes a first width along a first axis and a second width along a second axis transverse to the first axis, receiving the tine within an aperture of the support member while the tine is oriented with the second width substantially parallel to a longitudinal axis of the aperture of the support member, and engaging side walls of the support member with the second width of the fastener to securely fixate the tine to the support member.

The foregoing method advantageously allows a manufacturer or end user to more efficiently assembly and maintenance a harvesting reel at lower costs and outlays of time.

In accordance with yet another aspect of the subject application there is provided a tine for a harvesting reel of an agricultural harvester that includes an elongated body and a fastener. The fastener extends from the elongated body and is attachable to a support member of the harvesting reel. The fastener consists of a first width along a first axis, a second width along a second axis transverse to the first axis and greater than the first width, and a pair of recesses about lateral sides of the fastener for receiving a portion of the support member.

BRIEF DESCRIPTION OF THE SEVERAL VIEWS OF THE DRAWINGS

The foregoing summary, as well as the following detailed description of the subject application will be better understood when read in conjunction with the appended drawings. For the purpose of illustrating the subject application, there are shown in the drawings various aspects of the subject application. It should be understood, however, that the subject application is not limited to the precise arrangements and instrumentalities shown.

In the drawings:

FIG. 3 is a partial perspective view of a plurality of tines mounted to a support member of the gathering reel of FIG. 2 showing the attachment of the plurality of tines at various stages of attachment to the support member;

FIG. 4 is a partial perspective view of a support member of the gathering reel of FIG. 2 in accordance with an aspect of the subject application;

FIG. 5 is a perspective view of a tine in accordance with an aspect of the subject application;

FIG. 8 is a partial cross-sectional lateral side elevation view of the tine of FIG. 5 fully assembled to the support member of FIG. 4;

FIG. 9 is a front side elevation view the tine of FIG. 5 initially inserted into the support member of FIG. 4; and FIG. 10 is a partial perspective view of a plurality of tines at various stages of attachment to a support member of the gathering reel of FIG. 2.

DETAILED DESCRIPTION

Reference will now be made in detail to the various aspects of the subject application illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below, right, left, front, rear and diagonal, are used with respect to the accompanying drawings. Such directional terms used in conjunction with the following description of the drawings should not be construed to limit the scope of the invention in any manner not explicitly set forth. Additionally, the term "a," as used in the specification, means "at least one." The terminology includes the words above specifically mentioned, derivatives thereof, and words of similar import.

The terms "grain" and "grains" are used throughout the specification for convenience and it should be understood that these terms are not intended to be limiting. Thus, "grain" and "grains" refers to that part of a crop which is harvested and separated from discardable portions of the crop.

Figure 1:
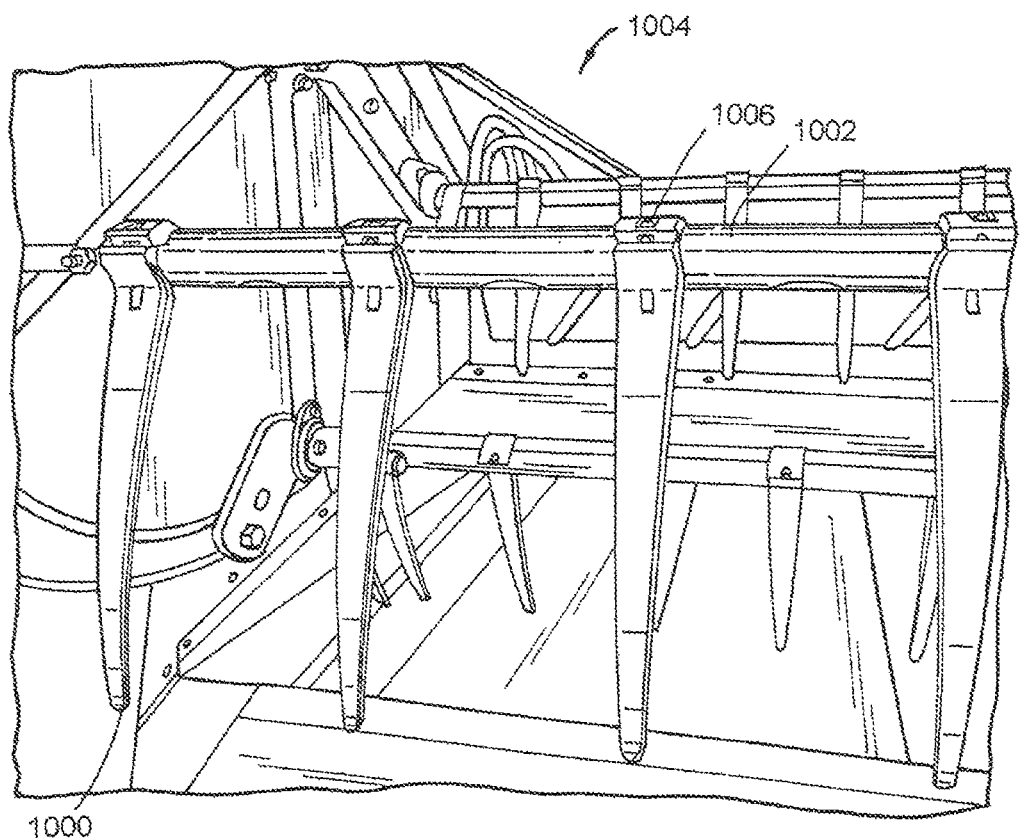
FIG. 1 is a perspective view of a conventional tine attached to a support member of a conventional gathering reel.

FIG. 1 illustrates a plurality of conventional tines 1000 assembled to a support member (or tine bar) 1002 of a conventional gathering reel 1004. Each tine 1000 includes an elongated body and a head for mounting onto the support member 1002 in a spaced apart relation. Each tine 1000 is also securely fixated in place by a separate screw fastener 1006. Such a screw fastener requires the use of a screwdriver or torque driver to securely fix the tine 1000 in position. Thus, as conventional gathering reels 1004 include about four hundred to five hundred tines, the need to assemble the screw fastener 1006 to the tine increases production costs and the overall number of components for manufacture. Further, conventional gathering reels 1004 require routine and/or constant maintenance to ensure that the tines are securely fastened to the support member. This requires the end user to not only carry additional tools for maintenance but also involves great expenditures in time for visually checking and maintaining such screw fasteners.

To simplify the overall number of components and assembly for manufacture of a gathering reel or any other type of reel applicable to harvesters, it would be beneficial to have a tine capable of assembling to the gathering reel without the need for separate fastener components or tools for assembly of the tines thereto. The advantages of such a tine are embodied in the various aspects of the subject application disclosed herein.

Figure 2:
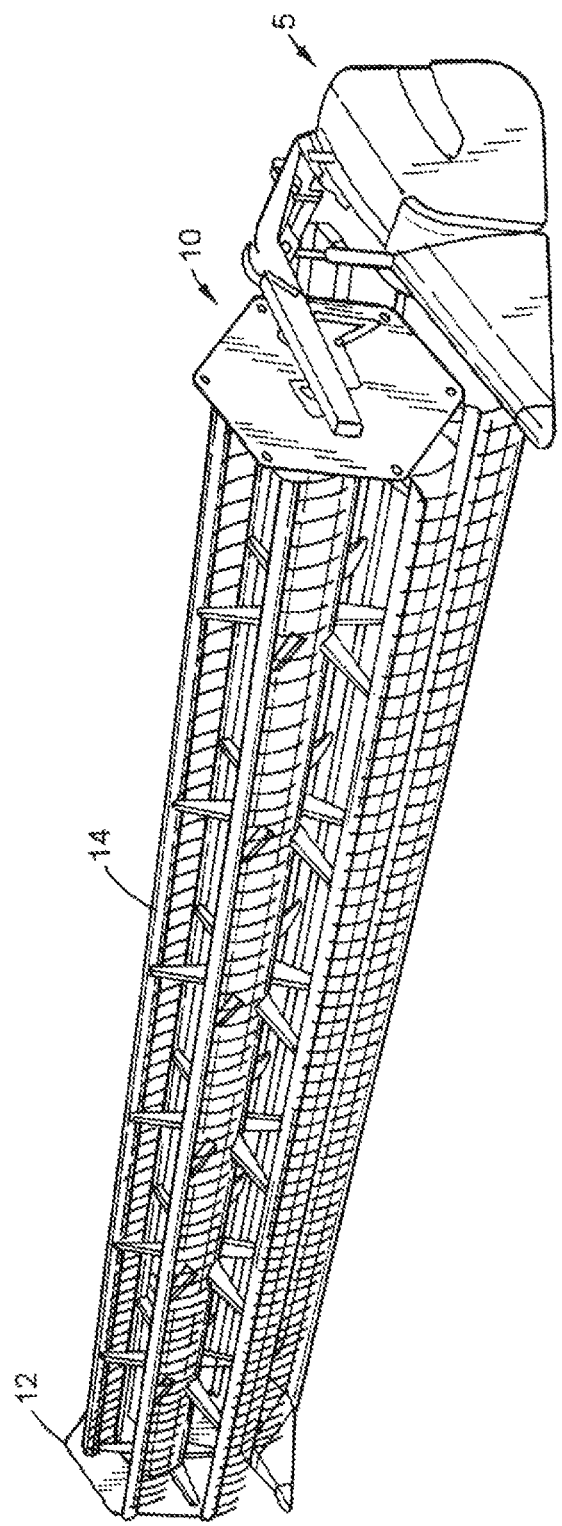
FIG. 2 is a front perspective view of a gathering reel mounted to a header of a harvester in accordance with an aspect of the subject application.

Referring to FIGS. 2-10, there is shown a harvesting reel 10 in accordance with a first aspect of the subject application. For purposes of illustrating the first aspect of the subject application, the harvesting reel has been illustrated as a gathering reel, but can alternatively be any harvesting reel, such as a pick up reel or a draper reel, in accordance with the teachings of the subject application. The harvesting reel 10 includes a frame 12 and a plurality of support members 14 mounted to the frame 12. The frame 12 is generally configured as shown in FIG. 2 and includes left and right ends and a central axis extending between the left and right ends. As known in the art, the harvesting reel 10 is mounted to a header 5 which is connectable to a front end of an agricultural harvester (not shown) so as to extend in a widthwise direction of the harvester. The plurality of support members 14 are arranged on the frame 12 extending in a widthwise direction of the harvesting reel 10 to form a substantially cylindrical reel, such as a hexagonal prism shaped reel.

The support member 14 is configured, as best shown in FIG. 4. The support member 14 is an elongated support member having a substantially inverted "U" shaped cross-section in a plane perpendicular to a longitudinal axis of the support member. In alternative aspects, the cross-section of the support member can be any other shape suitable for the stated intended us, such as but not limited to, semi-circular, triangular, semi-oval, concave, etc. The overall shape of the support member 14 is formed by opposing side walls which constitute a front side wall 16 and a rear side wall 18. A top wall 20 extends between the opposing side walls 16, 18. The support member 14 also includes a plurality of spaced apart apertures 22. Specifically, the top wall 20 is formed to have a plurality of spaced apart apertures 22 for receiving a tine 24 (FIG. 5), and in particular a detent of a respective tine, as further discussed below. The apertures 22 are positioned along the top wall 20 so as to be substantially equidistant from the front and rear side walls 16, 18 and equally spaced apart from each other.

The support member 14 also includes a flange extending inwardly from at least one of the opposing side walls 16, 18. In this particular aspect of the subject application, the support member 14 includes a pair of inwardly extending flanges 26a, 26b. The flange 26a extends inwardly of the support member from the rear side wall 18 while the flange 26b extends inwardly of the support member from the front side wall 16. The flanges 26a, 26b extend the entire length of the support member 14 thereby forming a narrow elongated slot or aperture 28 for allowing the passage of the tine 24 therethrough, as further discussed below. Each support member 14 is mounted to the harvesting reel 10 in a conventional manner, such as with the use of fasteners and/or mounting brackets.

The harvesting reel 10 also includes a plurality of tines 24, as configured and best shown in FIG. 5-10. The plurality of tines 24 is connectable to each of the plurality of support members 14. Each tine 24 includes an elongated body 30 and a fastener 32 extending from the elongated body for attaching the tine 24 to an individual support member 14. The elongated body 30 and fastener 32 are of unitary construction e.g., integrally formed or wholly integrated. That is, the elongated body and fastener of the tine are formed as a single part and constitute the entire tine without the need for any separate or secondary fastening or attachment device, such as a screw. The elongated body 30 is also configured to be arched or of a curvilinear configuration.

Figure 6:
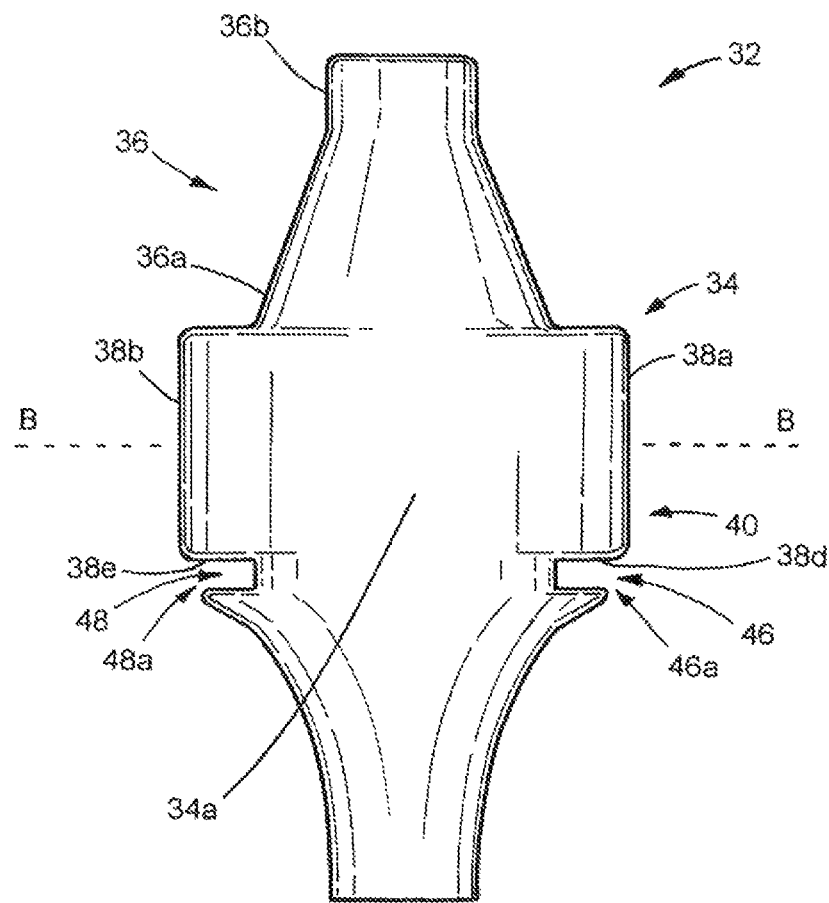
FIG. 6 is an enlarged partial lateral side elevation view of a fastener of the tine of FIG. 5.

Referring to FIGS. 5 and 6, the fastener 32 includes a main body portion 34 and a detent 36 extending from a top end of the main body portion 34. In other words, the detent 36 is positioned at a first end of the fastener 32 which is distal to the elongated body 30 of the tine 24. The detent 36 in this aspect is formed from a frustum section 36a and a cylinder or cylindrical boss 36b extending from the frustum section. In particular, the larger base end (bottom) of the frustum extends from the main body portion 34 while the cylinder 36b extends from the smaller base end (top) of the frustum. The cylinder 36b is sized and shaped to be received within and extend through one of the apertures 22 of the support member 14 while the frustum section 36a is sized and configured to block the passage of the fastener 32 from extending through the aperture 22, as shown in FIG. 8. The detent 36 can also alternatively be formed from various other configurations that allow it to properly engage a respective aperture 22 of the support member 14, such as being nipple shaped, dome shaped, or of any other detent configuration suitable for the foregoing intended use.

In this aspect of the fastener 32, the main body portion 34 is configured to have a cylindrical section 34a and a pair of diametrically opposed extensions 38a, 38b extending outwardly from the cylindrical section 34a. Thus, the fastener 32 includes a first width along a first axis A (FIG. 7) and a second width along a second axis B (FIG. 6) that is transverse to the first axis A. The first axis A extends along a length traversing only the cylindrical section 34a of the main body portion 34e and the second axis B extends along a longitudinal axis formed by the extensions 38a, 38b. In this particular aspect of the subject application, the second axis B also extends in a direction parallel to the arc of the tine 24. That is, the elongated body of the tine 24 is arched in a direction along a plane defined by the second axis B.

Figure 7:
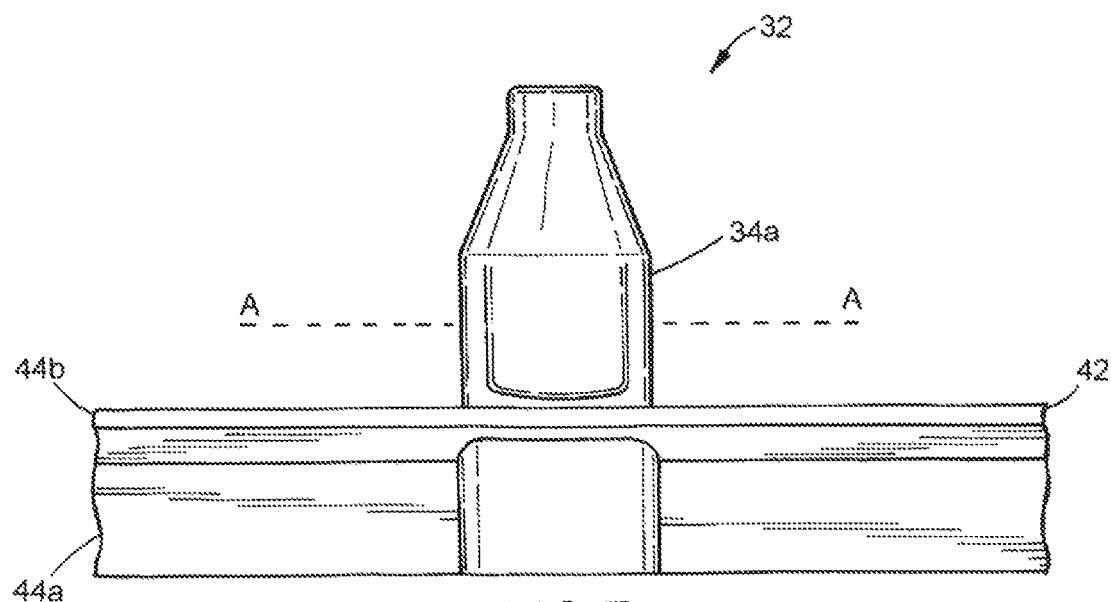
FIG. 7 is an enlarged partial front side elevation view of a fastener of the tine of FIG. 5.

As shown in FIGS. 6 and 7, the first axis A lies transverse to the second axis B at a perpendicular angle. However, the first axis A can alternatively lie transverse to the second axis B at non-perpendicular angles to the second axis B consistent with the limitations defining the first and second axes. Further, the second width is greater in size than the first width. Thus, when viewed in cross-section along a plane defined by the first and second axes, the fastener 32 has a substantially oval cross-section.

The fastener 32 is also sized such that the first width is less than the width of the slot 28 formed on the support member 14. Further, the fastener 32 is sized such that the second width is greater than the width of the slot 28. Thus, the fastener 32 is insertable within the support member 14 through the slot 28 when oriented such that its second axis is substantially parallel to the slot 28 but blocked from passing through the slot 28 when the fastener is rotated such that its second axis is substantially transverse to the longitudinal direction of the slot 28.

Referring to FIG. 6, the extensions 38a, 38b collectively with the main body portion 34 form a cam 40. Thus, the fastener 32 includes the cam 40 for camming against the support member 14, as further discussed below. Each extension 38a, 38b has rounded, convex, rectangular with rounded corner, or semi-circular shaped ends. Further each extension includes bottom surfaces 38d and 38e, respectively, which form engaging surfaces for engaging the flanges 26a, 26b of the support member 14 when the tine 24 is fixedly attached to the support member. This region below the extensions 38a, 38b otherwise form respective recesses 46, 48 for receiving the flanges 26a, 26b of the support member. Specifically, the recesses 46, 48 of the fastener are positioned at a second end of the fastener 34 opposite the first end situated proximate the detent 36. Thus, the fastener of the tine 24 includes a recess for receiving at least one flange of the support member 14, and the cam 40 is situated between the detent 36 and the recesses 46, 48. More particularly, the fastener includes a pair of recesses and each one of the pair of recesses is positioned about opposite lateral sides of the fastener.

In this particular aspect of the subject application, as shown in FIGS. 5, 7, 9 and 10, the tine 24 includes an optional bat 42 that extends in a widthwise direction of the tine 24. That is, the bat 42 extends substantially transverse to a longitudinal axis of the fastener 32. The bat 42 includes a vertical wall section 44a and a horizontal planar section 44b that extends along a top edge of the vertical wall section 44a. The horizontal planar section 44b in combination with the bottom surfaces 38d, 38e of the extensions 38a, 38b collectively form a pair of grooves or recesses 46a, 48a about the lateral sides of the fastener 32. That is, the fastener 32 includes a pair of grooves 46a, 48a and each one of the pair of grooves is positioned about opposite lateral sides of the fastener. The grooves 46a, 48a (along with the recesses 46, 48 described above) extend in a direction substantially parallel to the first axis A. While this particular aspect of the subject application is described with a bat 42, the tine 24 can alternatively be configured without the bat.

Referring to FIGS. 8-10, assembly or attachment of the tine 24 is accomplished by inserting the fastener 32 into the support member 14 while the second axis B is aligned and substantially parallel to the lengthwise direction of the slot 28 of the support member 14, as shown in FIG. 9. That is, the fastener's first width is sized to allow the fastener 32 to pass through the slot 28. The first width is also configured to be spaced apart from at least one of the opposing side walls 16, 18 of the support member 14 when received therein. As the fastener 32 is inserted through the slot 28 the cylindrical boss 36b of the detent 36 is aligned with one of the plurality of apertures 22 for insertion therein. The depth of insertion of the detent 36 through the aperture 22 is dictated by the frustum section 36a of the detent.

Upon the fastener 32 being fully inserted into the support member 14, the tine 24 is then rotated approximately ninety degrees about its longitudinal axis such that its second axis B is a substantially perpendicular to a longitudinal axis of the support member 14. That is, the fastener 32 is rotated within the support member 14 such that the cam 40 cams against both opposing side walls 16, 18 of the support member 14 for securely attaching the fastener thereto. That is, the second width of the fastener 32 engages the opposing side walls 16, 18 of the support member for securely attaching the fastener thereto thereby foregoing a need for any separate fixation device to fixate the tine to the harvesting reel. Further, when the detent 36 engages a respective aperture 22, the recesses 38d, 38e are engageable with the flanges 26a, 26b of the support member 14 when the cam 40 engages the opposing side walls 16, 18. In sum, the second width is greater than the first width for camming against the support member thereby providing a fixation force to fasten the tine to the harvesting reel while foregoing the need for any secondary attachment device.

Owing to the press fit sizing of the cam 40 relative to the internal spacing between the opposing side walls 16, 18, the cam 40 is locked in position when cammed to engage the opposing side walls 16, 18. Specifically, since the overall width of the cam 40 along its second width is slightly greater than the internal width between the opposing side walls 16, 18, the tine 24 is press fitted and locked in position when the fastener 32 is so oriented within the support member 14. That is, the cammed engagement of the cam 40 to the side walls 16, 18 provide a fixation force to fasten the tine to the harvesting reel while foregoing the need for any secondary attachment device.

Referring to FIG. 10, when the plurality of tine 24 are fully assembled on the support member 14, the ends of bat 42 of each respective tine are in side by side relation, as shown partially in FIG. 10, thereby forming a connected or continuous bat extending the entire width of the support member 14. The ends of the bats 42 also include a connection mechanism (not shown) for releasably connecting the ends to the ends of an adjacent bat.

Referring again to FIGS. 8-10 and in accordance with another aspect, the subject application provides a method of assembling a tine to a harvesting reel of an agricultural harvester. The method includes the act of providing a harvesting reel 10 having a support member 14 extending across a width of the harvesting reel and the act of providing a tine 24 having a fastener that includes a first width along a first axis and a second width along a second axis transverse to the first axis, as further described in the above aspects of the subject application. The second width is greater than the first width. In this particular method, the support member 14 receives the tine 24 e.g., via an operator or end user, within an aperture 28 of the support member while the tine is oriented with the second width substantially parallel to a longitudinal axis of the aperture 28 of the support member, as shown in FIG. 9. Thereafter, the side walls 16, 18 of the support member 14 are engaged with the second width of the fastener to securely fixate the tine 24 to the support member, as shown in FIG. 8 (engaging act).

To engage the side walls of the support member to the second width of the fastener a moment of force is provided. Specifically, the moment of force is provided in the engaging act to engage the second width of the fastener to the side walls of the support member by rotating the fastener 32 about a central axis thereby engaging the second width of the fastener to the internal surfaces of the side walls of the support member. Alternatively or in addition thereto, the engaging act includes the act of camming one of the second width of the fastener 32 and the side walls of the support member 14 with the other of the second width of the fastener and the side walls of the support member. For example, as shown in progression from FIG. 9 to FIG. 8, the extensions 38a, 38b are cammed against the inner surfaces of side walls 16, 18 of the support member to effectively engage the side walls of the support member with the second width of the fastener. In doing so, frictional forces between the inner surfaces of the support member 14 and the outer surfaces of the second width of the fastener 32 cooperate to securely fixate the tine 24 in position within the support member 14, which completely envelops the fastener. Further, the method includes the act of securely engaging a flange, such as flange 26a or 26b forming the aperture 28 of the support member 14 to a recess, such as recess 46 or 48, about the lateral sides of the fastener 32 of the tine 24 (FIG. 8).

In sum, the subject application provides a harvesting reel for an agricultural harvester and a method thereof that advantageously allows for easily connecting and assembling a plurality of times to the harvesting reel thereby decreasing production complexity and cost while also decreasing maintenance cost and time necessary for upkeep of the plurality of tines on the harvesting reel.

It will be appreciated by those skilled in the art that changes could be made to the various aspects of the subject application described above without departing from the broad inventive concept thereof. It is to be understood, therefore, that the subject application is not limited to the particular aspects disclosed, but it is intended to cover modifications within the spirit and scope of the subject application as defined by the appended claims.

We claim:

1. A harvesting reel for an agricultural harvester comprising:
    a frame;
    a plurality of support members mounted to the frame and extending in a widthwise direction of the harvesting reel, each support member including:
        opposing side walls, and
        a top wall extending between the opposing side walls, wherein the top wall includes a plurality of spaced apart apertures; and
    a plurality of tines each connectable to a respective one of the plurality of support members, wherein each tine is rotatable within the respective support member between a first position and a second position and includes:
        an elongated body, and
        a fastener extending from the elongated body for attaching to the support member, the fastener having:
            a detent engaging one of the plurality of spaced apart apertures, and
            a body adjacent the detent, the body having curved lateral ends and including:
                a first width along a first axis, wherein the first width of the body is spaced from the opposing side walls of the support member when in the first position, and
                a second width along a second axis transverse to the first axis, wherein the second width directly engages the curved lateral ends to the opposing side walls of the support member when in the second position.

2. The harvesting reel of claim 1, wherein the second axis is perpendicular to the first axis.

3. The harvesting reel of claim 1, wherein each of the support members further includes a flange extending inwardly from at least one of the opposing side walls, and wherein the fastener further includes a recess for receiving the flange of the support member, wherein the recess is engageable with the flange when the detent engages a respective aperture.

4. The harvesting reel of claim 1, wherein each support member further includes a flange extending inwardly from at least one of the opposing side walls.

5. The harvesting reel of claim 4, wherein the fastener of the tine includes a recess for receiving the flange of the support member.

6. The harvesting reel of claim 1, wherein each of the plurality of tines further includes a bat extending substantially transverse to a longitudinal axis of the fastener.

7. The harvesting reel of claim 1, wherein the elongated body of the tine is arched in a direction along a plane defined by the second axis.

8. The harvesting reel of claim 1, wherein the second width of the fastener engages the opposing side walls of the support member via press-fitting.

9. The harvesting reel of claim 1, wherein at least one of the plurality of support members has a longitudinal cross-section that is substantially U-shaped.

10. The harvesting reel of claim 1, wherein the detent of each fastener includes a frustum and a cylindrical boss.

11. The harvesting reel of claim 10, wherein the frustum is spaced from the opposing side walls and the top wall of the support member.

12. A tine bar assembly for a harvesting reel of an agricultural harvester comprising:
    an elongated support member; and
    a tine that includes:
        an elongated body; and
        a fastener extending from the elongated body and attached to the support member, the fastener including lateral sides having a curved cam, the fastener having:
            a first width along a first axis, and
            a second width along a second axis transverse to the first axis, wherein the curved cam is press-fitted against the support member fastening the tine to the support member.

13. The tine bar assembly of claim 12, wherein the fastener further comprises:
    a detent at a first end of the fastener which is distal to the elongated body; and
    a recess at a second end of the fastener opposite the first end.

14. The tine bar assembly of claim 13, wherein the cam is situated between the detent and the recess.

15. The tine bar assembly of claim 13, wherein the recess extends in a direction substantially parallel to the first axis.

16. The tine bar assembly of claim 13, wherein the detent includes a cylindrical boss.

17. The tine bar assembly of claim 12, wherein the fastener includes a pair of recesses and each one of the pair of recesses is positioned about opposite lateral sides of the fastener.

18. A method of assembling a tine to a harvesting reel of an agricultural harvester comprising:
- providing a harvesting reel having a support member extending across a width of the harvesting reel;
- providing a tine having a fastener with a capsule-shaped cross-section that includes a first width along a first axis and a second width along a second axis transverse to the first axis, wherein the second width includes opposing curved lateral ends;
- receiving the tine within an aperture of the support member while the tine is oriented with the second width substantially parallel to a longitudinal axis of the aperture of the support member; and
- camming into press-fitting engagement the curved lateral ends of the second width of the fastener against the walls of the support member to securely fixate the tine to the support member.

19. The method of claim 18, wherein the press-fitting act comprises the act of providing a moment of force to engage the second width of the fastener to the walls of the support member.

20. The method of claim 18, further comprising the act of securely engaging a flange forming the aperture of the support member to a recess of the fastener of the tine.

21. The method of claim 18, wherein the step of camming the second width of the fastener against the walls includes rotating the tine about a longitudinal axis of the tine about 90° degrees.

22. A tine bar assembly for a harvesting reel of an agricultural harvester comprising:

an elongated support member; and a tine that includes:

an elongated body; and a fastener extending from the elongated body and attached to the support member, the fastener comprising a main body having:

a first width along a first axis, a second width along a major axis transverse to the first axis including curved lateral ends contacting side walls of the support member, wherein the second width is greater than the first width, and a pair of recesses about lateral sides of the fastener formed by the main body and the elongated body for receiving a portion of the support member, wherein the main body has a substantially oval cross section along a plane defined by the first and major axes, and wherein the elongated body forming the recesses extends laterally less than the second width; and an elongated detent having a frustum section extending from a top end of the main body.

* * * * *